United States Patent Office 2,964,533
Patented Dec. 13, 1960

2,964,533

HETEROCYCLIC COMPOUNDS AND PROCESS FOR THE PRODUCTION THEREOF

Jost von der Crone, Basel, Switzerland, assignor to J. R. Geigy A.G., Basel, Switzerland No Drawing. Filed Dec. 30, 1957, Ser. No. 705,761

Claims priority, application Switzerland Dec. 19, 1957

7 Claims. (Cl. 260—325)

The present invention concerns a process for the production of heterocyclic compounds which are very valuable intermediate products for the production of pure, fast to light azomethine dyestuffs of the isoindoline-1-one series. It also concerns the substances produced according to this new process.

It has been found that new compounds of the isoindoline-1-one series which are valuable because of their reactivity, are obtained if aromatic o-cyanocarboxylic acid esters are reacted with alcohols in the presence of alkalies and/or earth alkalies. The reaction products correspond to the general Formula I

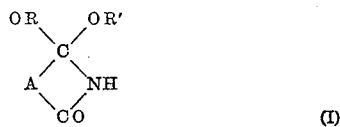

wherein:

OR and OR' represent the radicals of monoalcohols and both together also represent the radical of a dialcohol, and A represents an isocyclic-aromatic ring linked at two neighbouring carbon atoms to the hetero ring.

The aryl radicals in the o-cyanoaryl carboxylic acid esters used according to the present invention can be both mononuclear as well as polynuclear, but advantageously they contain not more than two benzene rings. Examples are the o-cyanonaphthalene and o-cyanodiphenyl carboxylic acid esters, but the o-cyanobenzoic acid esters are preferred starting materials because of their easy accessibility. Apart from the cyano and carboxylic acid ester groups defined, the aromatic rings of the o-cyanoaryl carboxylic acid esters can also contain other substituents insofar as they are inert, that is, they are stable under the reaction conditions.

Examples of such inert substituents are halogen atoms, alkyl, alkoxy, aryloxy, alkyl- and aryl-sulphonyl groups and also tertiary amino groups. Preferred starting materials are the higher halogenated o-cyanobenzoic acid esters because of the valuable properties of the azomethine dyestuffs which are obtained from 3.3-dialkoxy-isoindoline-1-ones produced therefrom.

The ester group of the starting materials used according to the present invention can be derived from aliphatic, araliphatic and cycloaliphatic hydroxyl compounds. Advantageously the derivatives of unsubstituted monoalkanols are used, but the alkyl radicals thereof can also contain substituents which are inert under the reaction conditions, for example alkoxy, aryloxy and aryl or tertiary amino groups. Because of their easy accessibility, chiefly such o-cyanocarboxylic acid esters are used the ester groups of which are derived from low molecular alkanols. The methyl, ethyl, propyl and butyl esters are preferred.

The mono- and divalent alcohols which are reacted with the aromatic o-cyanocarboxylic acid esters belong, advantageously to the aliphatic series, but also araliphatic and cycloaliphatic alcohols can be used. The organic radicals thereof can be substituted, provided the substituents are inert. Examples of substituents are aromatically bound halogens, alkoxy, aryloxy and aryl groups and, possibly, also tertiary amino groups.

Thus, in the Formula I, R and R' represent substituted or unsubstituted alkyl, cycloalkyl or aralkyl radicals. Examples of substituted alkyl radicals are alkoxyalkyl, aryloxyalkyl, tert. aminoalkyl radicals; of substituted cycloalkyl radicals are the homologous methylcyclohexyl radicals; of substituted aralkyl radicals are groups substituted at the aromatic radical by halogen, alkyl or alkoxy groups. Examples of R and R' are methyl, ethyl, propyl, butyl, hexyl, cyclohexyl, methylcyclohexyl, phenylmethyl, phenylethyl, phenoxyethyl, methylphenoxyethyl, chlorophenoxyethyl, methoxyethyl, ethoxyethyl, butoxyethyl, dimethylaminoethyl, diethylaminoethyl, piperidinoethyl or morpholinoethyl radicals. R and R' together also represent 1.2-alkylene or cycloalkylene radicals which can be still further substituted, for example 1.2-ethylene, 1.2-propylene, 1.2- or 2.3-butylene, 1.2-cyclohexylene radicals.

Of the alkane diols, in particular the α.β-dihydroxy compounds can be obtained by the new reaction, cyclic ethers being attained while a further hetero ring is formed. In particular, the monovalent low molecular alkanols are used in the present process as then the reaction begins very easily: also the 3.3-dialkoxy-isoindoline-1-ones so obtained are particularly valuable intermediate products for dyestuffs. Advantageously methanol, ethanol, n-propanol butanol, and methoxy and ethoxy ethanol are used as alcohols.

As defined, the reaction of the aromatic o-cyanocarboxylic acid esters with the alcohols is performed in the presence of alkalies and/or earth alkalies. The reaction begins even on using small amounts thereof but in order to attain a better yield it is of advantage to use about the equivalent amount. Alkali metals and earth alkali metals, oxides and hydroxides are used as alkalies which, in the reaction with the alcohols, can form the corresponding alcoholates. For technical reasons, solutions of the earth alkali metals, however, in particular those of alkali metals in excess aqueous alcohol are preferred.

Generally the isoindoline-1-ones substituted in the 3-position by ether groups according to the present process are formed at room temperature, in particular when the reaction is performed with low molecular alcohols and in the absence of water. If necessary however, and this does not injure the end products, it can be performed at a raised temperature. As already stressed, the reaction is performed advantageously in an excess of the alcohol used. This helps in the solution or fine distribution of the reaction components. It is also possible however, to perform the reaction in an inert organic solvent or diluent such as, e.g. acetone, dioxan, cyclohexane, benzene, chlorobenzenes or pyridine. In order to guard against a possible formation of mixtures of different ethers which would be difficult to separate, it is advantageous to use such o-cyanoaryl carboxylic acid esters as starting materials the ester groups of which are derived from the alcohols used in the reaction.

The isoindoline-1-one compounds produced according to the new process are obtained as alkali or earth alkali metal salts provided that hydrolytic decomposition does not occur during the working up process. These are converted with diluted acids into the free amides. Depending on the composition, these are often well crystallising, colourless substances, also they are often heavy oils which can be easily split with strong acids or strong bases into the corresponding phthalimides. The ether groups in the 3-position of these isoindoline-1-one compounds are easily mobile and can be replaced by other groups. For example they can be converted by treatment with ammonia, alkali metal amides or primary amines into the 3-imino-isoindoline-1-ones or into the 3-imino-isoindoline-1-ones substituted at the imino-N-atom. With alkali or earth alkali sulphides they produce the 3-thio-isoindoline-1-ones. 3-imino- and 3-thio-isoindoline-1-ones can naturally also be produced in a single step by treatment of the o-cyanocarboxylic acid esters with alkali metal amides or sulphides in alcoholic solution.

Because of their reactivity already mentioned, the compounds produced according to the present invention are valuable starting materials for the production of condensation products, for example of azomethine dyestuffs of the isoindoline series. These azomethine dyestuffs are obtained by condensation of the 3.3-dialkoxy-isoindoline-1-ones according to the present invention with polyprimary amines, whereby the ether groups are replaced by an imino group of the polyprimary amine. With regard to yield and colour strength chiefly those dyestuffs are valuable which are obtained with aromatic polyamines of the benzene, naphthalene, diphenyl and stilbene series, which dyestuffs contain the amino groups advantageously in positions bound by a chain of conjugated double linkages. Because of their greater colour strength and excellent fastness to light and migration in organic synthetic materials, those azomethine pigments are particularly valuable which are derived from higher halogenated isoindoline-1-ones. In the present process, tri- and tetrahalogen- in particular 3.4.5.6-tetrachloro-2-cyanobenzoic acid esters are particularly valuable starting materials with regard to the use as dyestuff intermediates. The azomethine dyestuffs are produced by reacting isoindoline-1-ones containing ether groups in the 3-position direct with the aromatic polyamines. They can, however, first be converted with ammonia or primary amines or by means of sulphides into the corresponding 3-imino- or 3-thio-isoindoline-1-ones and then reacting these with the aromatic polyamines while splitting off ammonia or primary amines or hydrogen sulphide, to form the desired azomethine dyestuffs. From the technical point of view it is worthy of mention that the synthesis of the valuable azomethine pigments can be performed in one single step, as the aromatic polyamine can be added direct to the reaction mixture of cyanocarboxylic acid ester and alcohol without the isoindoline-1-one intermediate product having first to be isolated.

No claim is made to the azomethine dyestuffs mentioned here and also in the examples. Further particulars can be seen from the following examples. Parts are given as parts by weight and the temperatures are in degrees centigrade.

*Example 1*

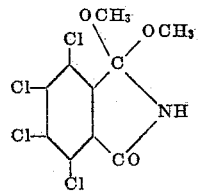

2.3 parts of sodium are dissolved in 200 parts of methanol. 15 parts of 3.4.5.6-tetrachloro-2-cyanobenzoic acid methyl ester are added at room temperature to this solution. It dissolves in 5 minutes with a rise of 5° in temperature. The whole is left to stand for 3 hours and then 1 litre of 1 N-acetic acid is added. The white precipitate formed is filtered off and washed with water. 15 parts of 4.5.6.7 - tetrachloro-3.3 - dimethoxy-isoindoline-1-one are obtained. It begins to sinter at 145° on decomposition.

*Analysis.*—Calculated: C 36.20, H 2.15, N 4.23, for $C_{10}H_7O_3NCl_4$. Found: C 36.67, H 2.02, N 4.50.

The same compound is obtained on using 4 parts of calcium instead of the sodium.

3.4.5.6-tetrachloro-2-cyanobenzoic acid methyl ester reacts in the same way with other alcohols also.

With sodium in ethyl alcohol, the colorless 3.3-diethoxy-4.5.6.7-tetrachloro-isoindoline-1-one is obtained. It begins to sinter at 160° on decomposition. With sodium butylate, sodium benzylate and the sodium compound of methoxyethanol, the corresponding 3.3-dibutoxy-, 3.3-dibenzyloxy- and 3.3-bis-methoxyethoxy-compounds are obtained as yellowish oils.

All these 3.3 - dialkoxy compounds of 4.5.6.7-tetrachloroisoindoline-1-one in glacial acetic acid react very easily on warming with diamines to form azomethine dyestuffs. For example on boiling for 2 hours 10 parts of 4.5.6.7-tetrachloro-3.3-dimethoxy-isoindoline - 1 - one and 4 parts of 4.4'-diamino-3.3'-dimethoxydiphenyl in 150 parts of glacial acetic acid, 9 parts of a fast to migration, yellowish-red pigment are obtained with which very fast to light dyeings in thermoplastic polymers are obtained. The 3.4.5.6 - tetrachloro-2-cyanobenzoic acid methyl ester can be produced as follows: asymmetrical 4.5.6.7 - tetrachlorophthalyl chloride is reacted with aqueous ammonia to form the ammonium salt of 3.4.5.6-tetrachloro-2-cyanobenzoic acid. This is converted into the barium salt with barium chloride and the barium salt is converted with dimethyl sulphate in acetone into the 3.4.5.6 - tetrachloro-2-cyanobenzoic acid methyl ester. Good yields are obtained. The ester, recrystallised from alcohol, melts at 83–84°.

*Example 2*

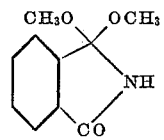

8 parts of 2-cyanobenzoic acid methyl ester are added to a solution of 2.3 parts of sodium in 200 parts of methanol. The solution is left to stand for 5 hours and then evaporated whereupon an oily product is obtained which, on warming with aromatic primary amines in glacial acetic acid, is very easily condensed to form azomethine compounds. For example, with 4.4'-diaminodiphenyl, a yellow pigment is obtained.

*Example 3*

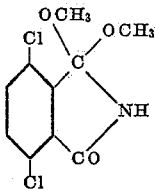

5.8 parts of 3.6-dichloro-2-cyanobenzoic acid methyl ester are added to a solution of 2.8 parts of potassium hydroxide in 100 parts of methanol. The mixture is left to stand for 3 hours and then completely evaporated. The potassium salt of 4.7-dichloro-3.3-dimethoxy-isoindoline-1-one is obtained in this way as a solid white residue. The potassium salt is very easily water soluble and is very quickly hydrolytically decomposed even at room temperature. When taken up in glacial acetic acid, it forms a brilliant yellow pigment very easily on warming with 4.4'-diaminodiphenyl.

3.6-dichloro-2-cyanobenzoic acid methyl ester is produced for example in the following manner:

3.6-dichloro - phthalic acid anhydride is chlorinated with phosphorus pentachloride to form 3.6-dichlorophthalyl chloride. This is reacted with ammonia to give the ammonium salt of 3.6-dichloro-2-cyano-benzoic acid.

The ammonium salt is then converted into the corresponding silver salt and this is converted with methyl iodide into 3.6-dichloro-2-cyanobenzoic acid methyl ester (M.P. 108–109°). Good yields are obtained.

*Example 4*

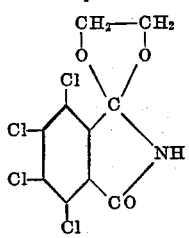

7.5 parts of 3.4.5.6-tetrachloro-2-cyanobenzoic acid methyl ester are added to a solution of 1 part of sodium in 100 parts of ethylene glycol. After stirring for 3 hours 100 parts of dioxan are added and a solution is obtained. The solution is left to stand for 2 hours and then poured into 1000 parts of 1 N-acetic acid. The precipitate formed is filtered off and dried. 9.5 parts of a product which melts at 250–255° are obtained which, according to analysis is 4.5.6.7-tetrachloro-3.3-ethylenedioxy-isoindoline-1-one.

*Analysis:*—Calculated: C 36.40, H 1.52, N 4.25, for $C_{10}H_5O_3NCl_4$. Found: C 36.48, H 1.60, N 4.32.

If 16.4 parts of 4.5.6.7-tetrachloro-3.3-ethylenedioxy-isoindoline-1-one and 2.7 parts of 1.4-diaminobenzene are boiled in 100 parts of glacial acetic acid, then 12.5 parts of an orange-yellow azomethine pigment which has good colour strength is obtained.

If, in the above example instead of the ethylene glycol the corresponding amount of 1.2-propylene glycol is used, then the corresponding 3.3-propylenedioxy-isoindoline-1-one is obtained.

*Example 5*

7.5 parts of 3.4.5.6-tetrachloro-2-cyanobenzoic acid benzyl ester are added to a solution of 1 part of sodium in 100 parts of methanol. The solution is allowed to stand for 5 hours and then is poured into 1000 parts of 1 N-acetic acid. The product which precipitates is filtered off under suction, washed with water and dried. 6.2 parts of 4.5.6.7-tetrachloro-3.3-dimethoxy-isoindoline-1-one are obtained. The product is identical to that described in Example 1.

The 3.4.5.6-tetrachloro-2-cyanobenzoic acid benzyl ester (M.P. 105–107°) can be produced from the silver salt of 3.4.5.6-tetrachloro-2-cyanobenzoic acid by treatment with benzyl iodide.

*Example 6*

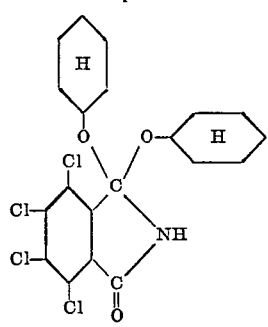

1 part of sodium is dissolved by warming in a solution of 20 parts of cyclohexanol in 100 parts of dioxan. 7.5 parts of 3.4.5.6-tetrachloro-2-cyanobenzoic acid methyl ester are added to the solution obtained. After stirring for 10 hours, the brown coloured reaction mixture is poured into 1 litre of 1 N-acetic acid. A brown oil separates which is isolated by decanting. Analysis thereof and its chemical reactions show that it is 4.5.6.7-tetrachloro - 3.3-dicyclohexyloxy-isoindoline-1-one. This, for example, forms oils which dissolve well in all organic solvents and, on heating with aromatic diamines in glacial acetic acid it forms very fast to light azomethine dyestuffs. Thus, with 4.4'-diamino-3.3'-dimethyl-diphenyl, a pure red pigment is obtained which has excellent fastness properties.

A similar 4.5.6.7 - tetrachloro - 3.3 - dicycloalkoxy-isoindoline-1-one is obtained if in the above example instead of cyclohexanol a methylcyclohexanol is used. The same condensation products are obtained as have been described above for the cyclohexyloxy compound.

*Example 7*

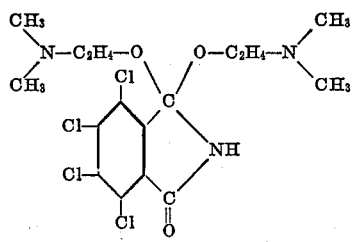

1.2 g. of sodium are dissolved in 50 parts of dimethylamino-ethanol. 7.5 parts of 3.4.5.6-tetrachloro-2-cyanobenzoic acid methyl ester are added to this solution whereupon the temperature of the mixture rises about 20°. After stirring for 3 hours at room temperature, the excess dimethylamino-ethanol is distilled off in the vacuum at 12 mm. Hg pressure. A brown coloured oil remains which dissolves very well in water. Analysis thereof and its chemical reactions show that it is 4.5.6.7-tetrachloro - 3.3 - bis - (dimethylamino-ethoxy)-isoindoline-1-one. If, for example it is boiled for 2 hours in glacial acetic acid with 4.4'-diaminodiphenyl, then an orange azomethine dyestuff precipitates which has very good fastness to light.

The same dyestuff is also obtained with 3.3-bisaminoethoxy-isoindoline-1-one which compound is obtained with diethylaminoethanol.

What I claim is:

1. An isoindoline-1-one compound of the general formula:

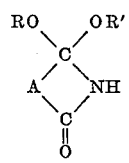

wherein R and R' represent identical members selected from the group consisting of alkyl, alkylaminoalkyl, lower alkoxyalkyl, cyclohexyl, methylcyclohexyl, phenylmethyl, phenylethyl, phenoxyethyl, methylphenoxyethyl, chlorophenoxyethyl, piperidinoethyl and morpholinoethyl, the alkyl being lower alkyl throughout, and wherein R and R' taken together represent a member selected from the group consisting of 1.2-ethylene, 1.2-propylene, 1.2-butylene, 2.3-butylene and 1.2-cyclohexylene radicals, and A is a six-membered mononuclear carbocyclic radical, two adjacent carbon atoms of which are bound to the heterocycle.

2. An isoindoline-1-one compound of the general formula:

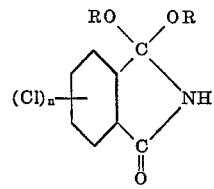

wherein R is a lower alkyl radical and $n$ is a whole number from 2 to 4.

3. The isoindoline-1-one compound of the formula:

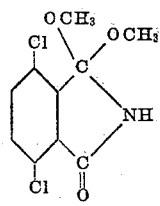

4. The isoindoline-1-one compound of the formula:

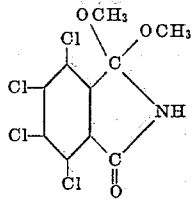

5. The isoindoline-1-one compound of the formula:

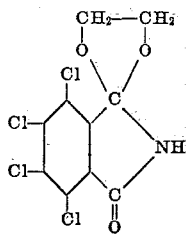

6. The isoindoline-1-one compound of the formula:

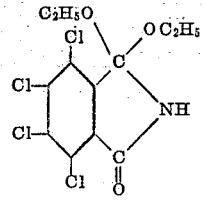

7. Process for the manufacture of 3.3 - dialkoxy-isoindoline-1-ones by treating a member selected from the group consisting of o-cyanobenzoic acid lower alkyl and benzyl esters and chloro-o-cyanobenzoic acid lower alkyl and benzyl esters with a solution in a lower alkanol of a member selected from the group consisting of alkali metals, earth alkali metals, alkali hydroxides and earth alkali hydroxides.

References Cited in the file of this patent
UNITED STATES PATENTS

| | | |
|---|---|---|
| 1,908,705 | Jaeger | May 16, 1933 |
| 2,537,352 | Jones | Jan. 9, 1951 |
| 2,701,252 | Vollman et al. | Feb. 1, 1955 |

OTHER REFERENCES

Ind. and Eng. Chem., vol. 39, No. 11, p. 1420 (1947).
Tscherniac, Ber. Deut. Chem., vol. 40, pp. 2709–14 (1907).
Dunet et al.: Compt. Rend. (Fr. Acad.), vol. 226, pp. 821–3 (1948).
Dunet et al.: Bull. Soc. Chim. de France (1948), pp. 887–9.